Figure 4:
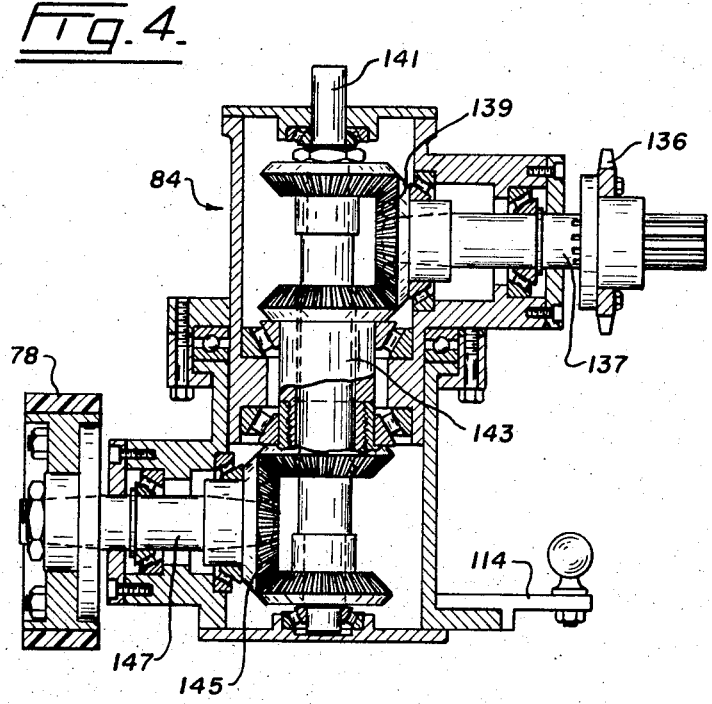

United States Patent [19]
Wutke

[11] 3,728,924
[45] Apr. 24, 1973

[54] DOUBLE CARRIAGE SHEAR

[76] Inventor: Alwin O. Wutke, 636 East 53rd Avenue, Vancouver, British Columbia, Canada

[22] Filed: Mar. 29, 1971

[21] Appl. No.: 128,893

[52] U.S. Cl. .................... 83/426, 83/435, 83/436
[51] Int. Cl. ................................... B23d 19/04
[58] Field of Search .............. 83/32, 46, 426, 425, 83/433, 435, 436

[56] References Cited

UNITED STATES PATENTS

| 3,301,114 | 1/1967 | Joa ........................................ 83/401 |
| 1,353,756 | 9/1920 | Johnson ............................. 83/426 X |

Primary Examiner—Gil Weidenfeld
Attorney—Fetherstonhaugh & Co.

[57] ABSTRACT

A cutting machine for sheet materials having a pair of circular cutters mounted on parallel spaced axles, with the cutting edges of the cutters touching each other and being slightly overlapped. A steerable, power driven feeding arrangement permits the cutting of variable curves. Straight cuts of infinite length and circles are also possible.

9 Claims, 6 Drawing Figures

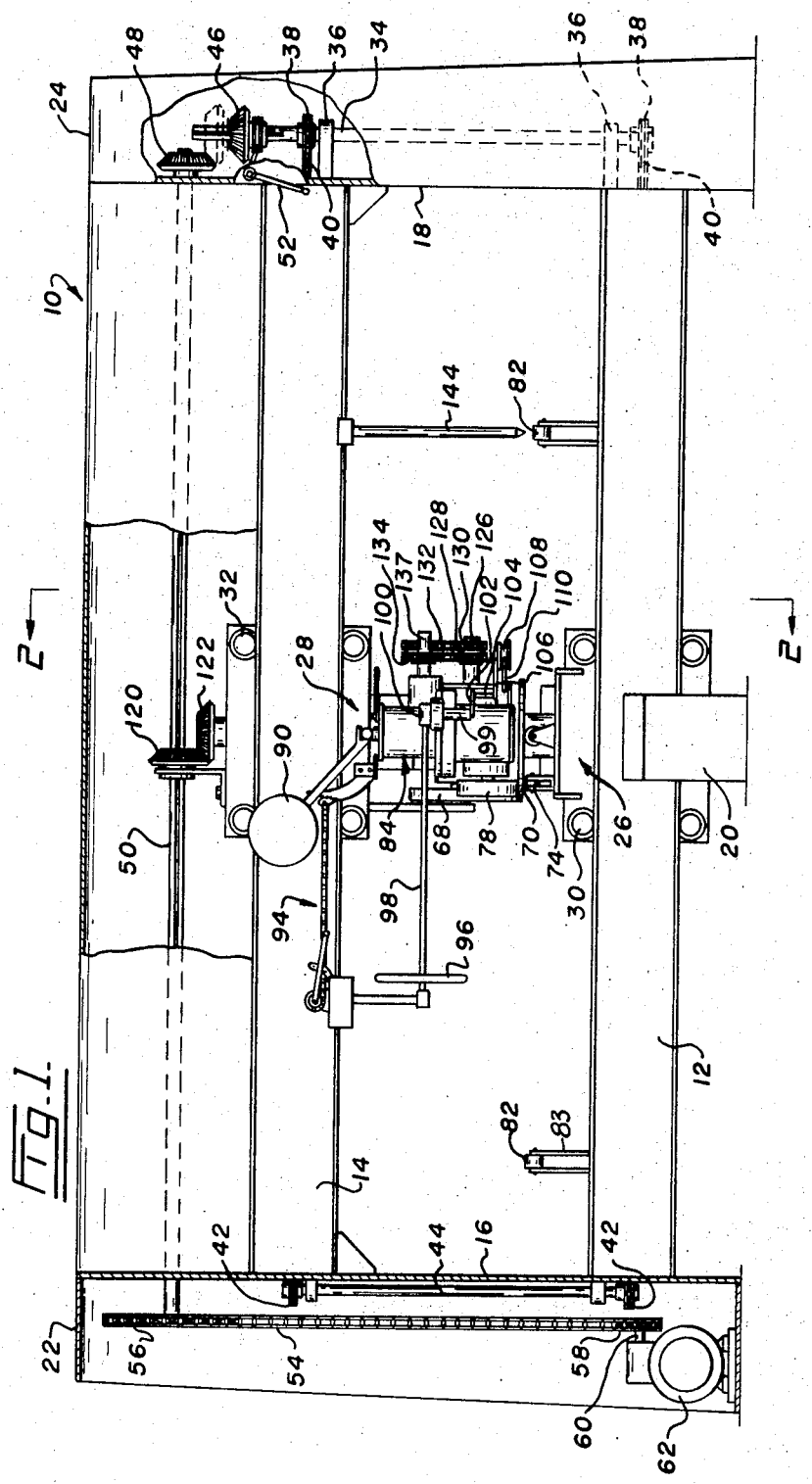

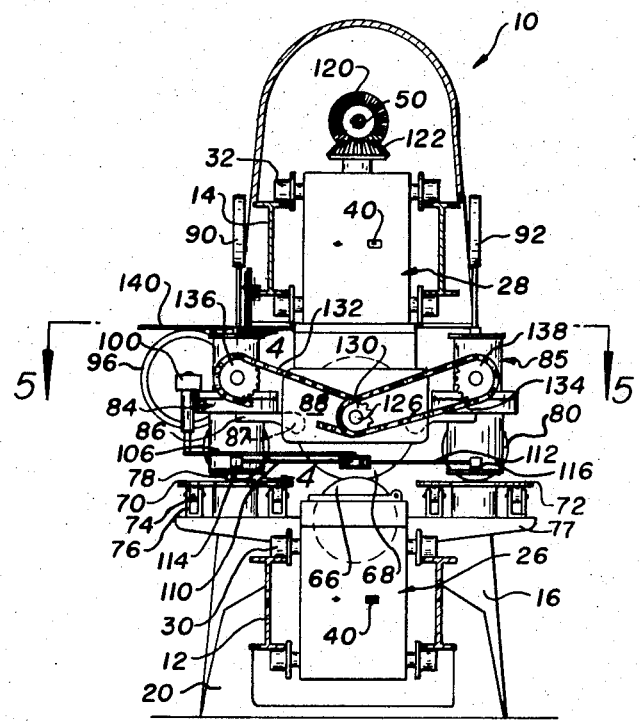
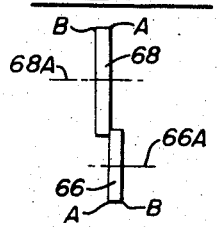
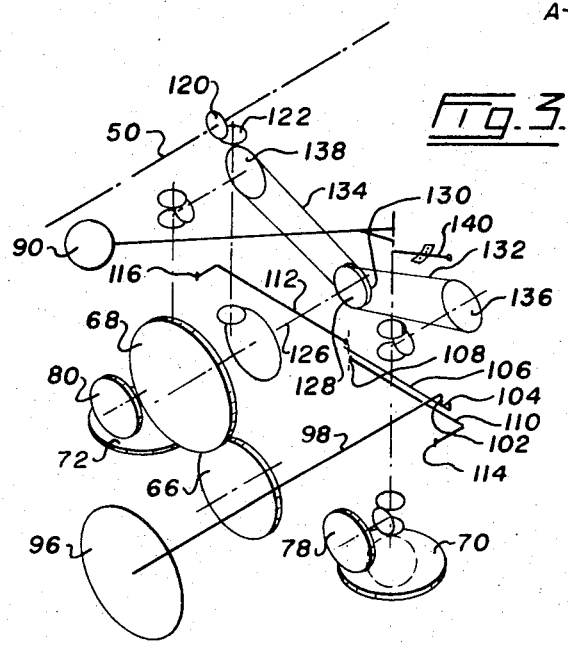

INVENTOR
ALWIN O. WUTKE
BY
*Fetherstonhaugh & Co.*
ATTORNEYS

DOUBLE CARRIAGE SHEAR

This invention relates to cutting machines and is particularly concerned with shears for cutting sheet materials including sheet metals.

At present, most cutting operations carried out on steel and other metal plates are done on shearing machines utilizing a pair of vertically oriented cutting blades which shear the plate with a vertical cutting action. One disadvantage of this type of shearing machine is that the cut possible is length limited by the size of the cutting blades. Needless to say it is possible to build such a machine in various sizes but the fact remains that for any particular machine there is a limitation on the size of cut that can be made. A second disadvantage of the standard type of vertical shear is that while it is possible to make curved cuts including circular cuts by appropriately shaping the cutting blades the machines are always limited to a cut defined by the shape of the blades installed. While any one machine can be adapted to make different shaped curved cuts this can only be done by changing the blades. Thus, these machines have the drawback that the blade changing process is a time consuming one and the need for a number of sets of blades is an added cost. It will also be recognized that even with a number of interchangeable cutting blades the number of curved cuts that can be made are limited i.e. that in no sense is there an infinite selection of curves that may be cut.

It is therefore a primary object of this invention to provide a cutting machine for cutting sheet materials including sheet metals without limit on the length of cut that can be made.

It is a further object of the invention to provide a cutting machine adapted to make curved cuts of infinite variety without modifying the machine in any way as, for example, by replacing cutting blades.

It is a further and related object of the invention to provide a cutting machine which includes power driven means for feeding the work pieces through the machine with the feeding means being steerable so that lines marked on the work pieces can be followed by an operator.

According to the invention a cutting machine which meets the above objects includes a pair of circular cutters carried on spaced parallel axles with each of the cutters having a peripheral cutting edge, the two cutting edges being in touch with each other and slightly overlapped. Sheet material to be cut is fed between the circular cutters by a feeding arrangement which includes a friction wheel and a rotatable idler between which the sheet material to be cut is nipped. The feeding means preferably also includes an outfeed friction wheel and associated idler which is positioned diammetrically opposite said infeed friction wheel relative to said cutters. As an integral part of the feeding means there is included a steering mechanism by which the orientations of the feed wheels can be changed in a synchronized way so that they operate together to move the work piece relative to the cutters in a precise and predetermined direction. This direction can be changed at will and in a continuous fashion by the operator so that a cut of any curved configuration can be made in the work piece.

The invention will be more fully understood from the following description of a preferred embodiment thereof as read in conjunction with the accompanying drawings.

Figure 5:
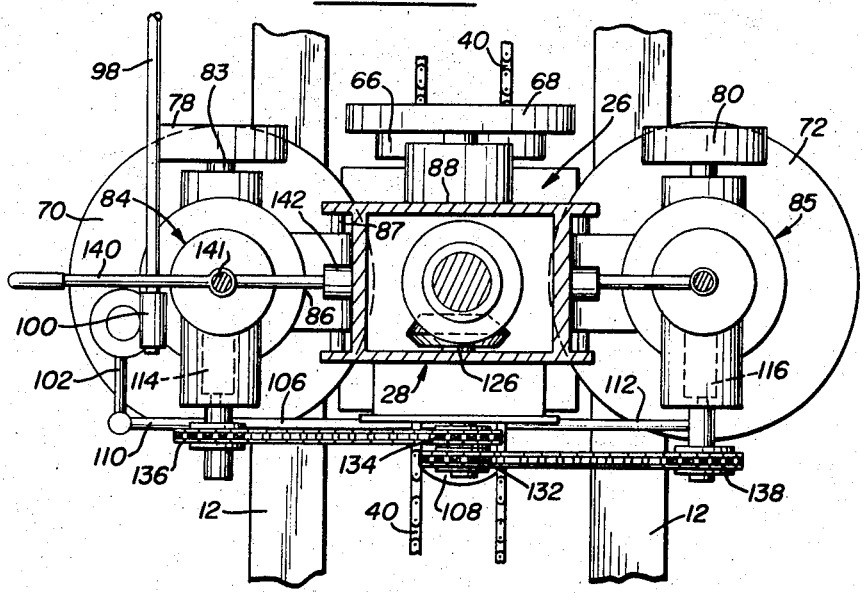

In the drawings:

FIG. 1 is a front elevation view of a double carriage shear in accordance with the invention with certain parts of the machine being broken away to reveal certain details of the inner workings of the machine, FIG. 2 is a vertical cross-sectional view taken along the line 2—2 of FIG. 1, FIG. 3 is a schematic perspective view of the drive chain within the machine of FIGS. 1 and 2, FIG. 3a is a schematic view showing cutters of the machine, FIG. 4 is a cross-sectional view taken along the line 4—4 of FIG. 2, and FIG. 5 is a horizontal section taken on line 5—5 of FIG. 2.

Referring to FIG. 1, a frame 10 is essentially made up of a lower carriage track 12 consisting of a pair of I-beams 12 and a similar upper carriage track 14 also consisting of a pair of I-beams. The tracks are fixed at their ends to a pair of end plates 16 and 18. The bottom edges of the end plates act as footings whereby the machine is rested on the floor, there being a third footing 20 supporting the lower tracks 12 at their middles. End plates 16 and 18 also carry a pair of shrouds 22 and 24 and co-operating doors (not shown) which serve as cabinets enclosing certain parts of the drive chain for the machine, as will be explaned in greater detail hereinafter.

Supported on the lower tracks 12 is a first carriage 26 while a similar carriage 28 is supported on the top track girders 14. As can best be seen in FIG. 2, both carriages are supported on the tracks for horizontal movement, the lower carriage being connected to the tracks through flanged bearing wheels 30, similar wheel 32 connecting the upper carriage to tracks 14. As described below, the carriages each carry a circular cutter mounted on a horizontal axle, which cutters each carry a peripheral cutting edge with the two cutting edges touching each other and being slightly overlapped (in the order of ⅛ inch). It can be seen therefore that the sheet material being cut on the machine moves in a horizontal plane between the two cutters i.e. between the upper and lower carriages. The reason that the carriages are mounted for lateral movement is simply that the machine is therefore rendered capable of accommodating materials to be cut of different sizes. For example, if it were desired to trim the edge off a wide piece of sheet steel, for instance, the carriages would be moved well to the left of their position shown in FIG. 1. Furthermore, as is also explained in greater detail hereinafter, the machine of the invention is capable of cutting full circles and the fact that the carriages can be moved is utilized in setting up the machine to cut a circle of a particular desired diameter. In any case, it will be apparent that whether the carriages are being moved to accommodate a larger sheet of material or to cut a larger circle, it is essential that both carriages move as if they were one because it is essential under all circumstances that the pre-set cooperative relationship between the two cutters is maintained. A preferred arrangement for achieving this single movement of the carriages is illustrated in FIG. 1. At the right hand end of the machine, as seen in FIG.

1, a shaft 34 is mounted in a pair of vertically spaced bearings 36 attached to end plate 18. Shaft 34 carries a pair of sprockets 38 on which are engaged a pair of drive chains 40. Each chain extends across the width of the machine and is engaged on a sprocket 42 carried at one end of an idler shaft 44. Each chain has its two ends fixed to either side of the carriage with which it is associated, with the other run of the chain passing through a hole in the carriage. Thus, as shaft 34 is rotated, the carriages are caused to move back and forth on tracks 12 and 14, always doing so in a precise way so as to maintain the pre-set relationship between the two cutters. To effect rotation of shaft 34 there is fixed to its upper end a splined bevel gear 46 which may be moved in and out of mesh with a bevel gear 48 carried by main drive shaft 50 by means of a suitable crank 52. Main drive shaft 50 is, in turn, driven by a chain 54 working on a sprocket 56 fixed to the opposite end of shaft 50, with the chain 54 having its lower end engaged on a sprocket 58 fixed to the output shaft of a gear box 60 connected, in turn, to a motor 62. The motor is reversible and suitable switching arrangements are provided so that the motor can be rotated in either direction whereby the carriages can be moved in either direction.

To summarize the foregoing, it can be simply stated that the two carriages 26 and 28 each carry a circular cutter which are in contact with one another and that there is provided an arrangement of chains, sprockets and gears whereby the two carriages may be moved together, utilizing power from the main driving motor, so as always to maintain the same pre-set cooperative relationship between the two cutters.

The two cutters themselves can best be seen in FIGS. 2 to 4. They are a lower cutter 66 attached to carriage 26 and an upper cutter 68 attached to upper carriage 28. Each cutter is mounted for free rotation on its own horizontal axle (shown schematically by lines 66A and 68A in FIG. 3a) i.e. the cutters themselves are not positively driven but only rotate when a work piece passes between them. As a preferred expedient, each cutter is a disk of sufficient thickness (see particularly FIG. 3a) that two peripheral cutting edges designated A and B can be carried by each cutter. Thus, when a first pair of cutting edges A becomes dull a second fresh pair B can be put into service simply by removing the cutters from their axles and turning them around. Preferably the cutting edges A and B are built up with cutting tool steel on a tougher but milder base plate but it will be appreciated that the nature of the cutting edges is dictated largely by the nature of the material which is to be cut on the machine.

As the sheets being cut move between the cutters it is necessary that the sheets be supported. This is obviously particularly true when cutting heavier materials and as machines manufactured in accordance with the invention would be capable of cutting sheet steel up to ⅜ of an inch in thickness, the supporting arrangement must be capable of carrying a considerable weight. In the preferred embodiment of the invention which is illustrated in the drawings the sheet being cut is supported by a pair of rotatable tables 70 and 72, see particularly FIG. 2. These tables are carried on central axles and have their outer edges supported by three rollers 74 carried by brackets 76 which are mounted on transversely extending arms 77. As is explained hereinafter, tables 70 and 72 co-operate with an infeed wheel 78 and an outfeed wheel 80 respectively when work pieces are being fed through the machine. The co-operation referred to simply means that tables 70 and 72 act as rotatable backstops against which the wheels 78 and 80 are pressed as to create a nipping action on the work piece moving through the machine. This being the case it will be appreciated that tables 70 and 72 are canted slightly so that as the tables rotate they do not bind against the underside of the work piece. Additional support is provided by rollers 82 (FIG. 1) which are spaced some distance away from the center of the machine. There are four of these additional support rollers, two on either side of the center of the machine and attached to the top surface of girders 12. As a preferred expedient support rollers 82 can be moved from their illustrated positions should it be necessary to do so in order to properly support a work piece having an unusual shape. This adjustment of the rollers 82 is achieved by rotatably mounting said rollers in transverse members 83 which are clamped to the tracks 12 by suitable means, not shown, thus enabling them to be moved towards and away from one another as required and to be secured at a selected spacing.

Reference has already been made to an infeed wheel 78 and an outfeed wheel 80. These feed wheels are power driven and as previously mentioned they move a work piece through the machine by pinching the work piece between themselves and the rotatable support tables 70 and 72. As a preferred expedient, feed wheels having different facings are provided and can be interchanged one for the other. Thus, plastic faced wheels are used for cutting lighter gauge sheet iron and other lighter materials while steel wheels provided with fine gripping teeth are used for handling thicker steel plates.

Both feed wheels can be independently raised and lowered. The arrangement which permits this action can best be seen in FIGS. 2 and 5. Referring to infeed wheel 78 it can be seen that it is mounted on a horizontal axle 83 (FIG. 5) which protrudes from a gear housing 84 which is fixed to a lever 86 having its inner end pivotally connected to a horizontal shaft 87 on a main body member 88 which depends downwardly from upper carriage 28. A lever 140 is suitably connected intermediate its length to the housing 84 as shown at 141 in FIG. 5 and the inner end of this lever is universally connected at 142 to the body member 88. Thus, it can be appreciated that infeed wheel 78 is raised and lowered relative to support table 70 by swinging lever 140 on its inner end pivot whereby the gear housing 84 is raised and lowered. To assist in the raising and dropping of the infeed wheel a counterweighted lever 90 (FIGS. 1 and 2) is fixed to the upper end of housing 84. The outfeed wheel 80 is raised and lowered in the same way by similar mechanism and it is also provided with its own counterweighted lever 92 (FIG. 2 only). In order to permit the operator to raise and lower the outfeed wheel 80 while standing at the front of the machine i.e. to the left of the machine as viewed in FIG. 2 a suitable linkage arrangement is provided to extend through the upper end of the machine and which is operatively connected to the above described raising and lowering mechanism, the linkage arrangement being generally indicated by the reference numeral 94.

Both the infeed and the outfeed wheels can be swung about a vertical axis. In the case of infeed wheel 78 this axis is aligned with the centerline of gear housing 84 while in the case of the outfeed wheel 80 the axis corresponds with the centerline of its equivalent gear housing 85. Referring again to the infeed wheel, the housing 84 (see FIG. 4) is made up of a fixed upper part and a rotatable lower part, rotatable, that is, about the axis just mentioned in the vertical centerline of the housing. It can be seen, therefore, that as the lower part of housing 84 is rotated relative to the upper part, infeed wheel 78 which stands to one side of the housing will swing about the centerline of the housing. In this regard it will be noted that tables 70 and 72 are so dimensioned that when the feed wheels are swung to new positions they still can co-operate with the top surfaces of the tables to provide the nipping action necessary to move the work piece through the machine.

An important feature of the cutting machine of the invention is that it is possible to swing the feed wheels about the aforementioned vertical axes while a work piece is moving through the machine. Indeed, the feeding arrangement is such that the operator can continuously and accurately "steer" the work piece as it moves through the cutters so that cuts of variable curvature can be made. Needless to say, as the infeed wheel and the outfeed wheel are both working on the same work piece at the same time they must be moved in unison i.e. moved in such a way that they are not working against each other with the infeed wheel trying to move the work piece in a first direction and the outfeed wheel trying to pull the work piece in another direction.

The steering mechanism which effects the required unified control of the feed wheels includes a steering wheel 96 fixed to and adapted to rotate a horizontal shaft 98 which terminates within a housing 100. By suitable gearing means within housing 100 the rotation of shaft 98 is transferred to a vertical shaft 99 within the housing and depending therefrom. The lower end of the latter shaft is connected to a lever arm 102 which, by means of a pair of links 104 and 106 effects rotation about a vertical axis of a control member 108. In turn, rotation of the control member moves a pair of connecting rods 110 and 112 having their outer ends pivotally connected to lever arms 114 and 116 respectively which are in turn connected to the lower rotatable parts of housings 84 and 85 respectively. Thus, it can be seen that the rotation of steering wheel 96 will, through the various linkages mentioned, cause a rotation of the two housings and a reorientation of the feed wheels 78 and 80. In view of the manner in which the connecting rods 110 and 112 are attached to the control member 108, the two feed wheels are caused to move in unison i.e. that when feed wheel 78 moves in one direction the outfeed wheel 80 will move in a similar direction so that the two feed wheels always remain parallel to one another.

As previously mentioned, cutters 66 and 68 are not driven in a positive sense but only rotate as a result of the movement of a work piece between them. The motive force for moving a work piece is derived only from the feed wheels, as previously mentioned. The power for driving the feed wheels is, in turn, taken off main shaft 50 through bevelled gears 120 and 122. The latter gear is fixed to the upper end of a central vertical shaft with appropriate gearing contained within main housing 28 to convert the rotation of that shaft to a horizontal output shaft 126. Engaged on the latter shaft by a sliding splined connection are a pair of sprockets 128 and 130. Engaged on the sprockets are a pair of chains 132 and 134 which drive a pair of sprockets 136 and 138 connected to horizontal shafts leading into the upper parts of housings 84 and 85. Contained within these housings are appropriate gearing arrangements for rotating the drive wheels, which gearing arrangements permit the lower parts of the two housings to rotate relative to the upper parts as previously mentioned and which also eliminate any backlash when the direction of rotation of the drive wheels is made (by changing the direction of rotation of the drive motor 62 which in turn changes the rotation of the drive shaft 50 etc.). These gearing arrangements are shown in detail in FIG. 4.

It should also be noted that there are occasions when it is advantageous to shift the infeed and outfeed wheels 78 and 80 to the right or left as viewed in FIG. 1. To ensure that this is possible with wheel 78 for example, lever 86 by which the housing 84 is attached to the main body 88, has its inner end slidably i.e. its pivoted end mounted on the short horizontal shaft 87 which is fixed to the main body member 88. Thus, the wheel 78 can be moved as described by means of the lever 140 while the similarly mounted wheel 80 can also be adjusted vertically and horizontally by its lever 140 operated through the linkage arrangement 94.

For cutting circles a movable center punch 144 is located at a point equidistant between the two support rollers 82 on the right hand side of the machine as viewed in FIG. 1. This center punch has a pointed lower end of sufficient hardness that it can be forcibly recessed (by suitable means, not shown) into the top surface of a work piece with the lower surface of the work piece immediately beneath the pointer being nested by a support block (not shown). The right hand (FIG. 1) support rollers 82, the center punch 144 and the underlying support block all are appropriately mounted on the frame 10 so as to be shiftable to one side or the other so that the diameter of the circular cut to be made is selected by locating the assembled unit consisting of center punch 144 and its support block at the appropriate distance from the cutters.

Referring now to FIG. 4, the gearing arrangement for driving infeed wheel 78 is contained within housing 84, as previously mentioned. It is the purpose of this arrangement to convert the rotation of sprocket 136 to a rotation of wheel 78 while, at the same time, permitting relative movement between the upper and lower halves of the housing and preventing any backlash effects as the direction of rotation of the feed wheel is reversed. The gear train connecting sprocket 136 to wheel 78 is as follows.

The sprocket is connected to the splined outer end of a first shaft 137 supported within thrust bearings and carrying a bevel gear 139 at its inner end. The latter gear is in mesh with a pair of similar gears connected respectively to a second shaft 141 and to rotatable sleeve 143. Thus, rotation of shaft 137 effects opposite rotations of shaft 141 and sleeve 143. The latter carry another pair of bevel gears at their other ends which are in mesh with gear 145 fixed to output shaft 147 carrying infeed wheel 78 at its outer end. Thus, the above described chain and sprocket arrangement provide a torque compensator so that, when the direction of rotation of shaft 137 is changed, there is no delay in response by shaft 147 such as would occur if only a single gear chain were used.

While the manner in which the cutting machine of the invention is operated should be understood from the foregoing description of the machine the following summary of the operating procedure will serve to emphasize the versatility of the machine. First of all it should be understood that the machine operator stands in front of the machine i.e. on the left side of the machine when the latter is viewed as shown in FIG. 2. The operator is equipped with a switching cable by which he can easily stop and start the motor 62 as well as change its direction of operation. Thus, if at any time the operator wants to move a work piece backwards i.e. to the left in FIG. 2 he can readily do so simply by reversing the motor. In the normal course, however, the infeed wheel rotates in the direction necessary to move the work piece to the right with the outfeed wheel 80 doing the same. The setup shown in the drawings is the arrangement to effect straight cuts and it will be appreciated that by the use of circular cutters it is possible to make infinitely long cuts.

As a first step, the operator will manually feed the end of the work piece along the top surface of table 70 until its leading edge contacts the cutters 78 and 80. While this is being done infeed wheel 78 will have been raised upwardly by means of lever 140 so that the operator has no difficulty in manually manipulating the leading edge of the work piece. Once the leading edge contacts the cutters, however, the operator would not normally be able to force the work piece between the cutters so that the infeed wheel 78 must be brought into operation. This is done by lowering the feed wheel by means of lever 140 until the work piece is tightly nipped between the infeed wheel and the top surface of table 70. At this stage counterweighted lever 90 prevents the infeed wheel from rising i.e. the wheel is pressed tightly against the top surface of the work piece and is locked in that position.

The motor is then started so that the main shaft 50 is rotated and by the various gearing arrangements previously described the rotation of the drive shaft 50 is eventually transmitted to infeed wheel 78. Thus, the work piece is forcibly driven between the cutters and eventually its leading edge reaches the area of the outfeed wheel 80. At this stage the outfeed wheel 80 is lowered down onto the top surface of the work piece by the mechanism 94. Thus, both the infeed and the outfeed wheels are brought into play and as they always work in a co-operative fashion, very accurate control on the movement of the work piece can be achieved. When cutting a curve the operator simply manipulates steering wheel 96, utilizing a pointer (not shown) at the front end of the machine for following a curve marked on the work piece. In other words, he utilizes steering wheel 96 to see that the curve marked on the work piece is transcribed by the pointer i.e. the direction of movement of the work piece is changed so that the pointer can follow the curve marked on the work piece by swinging the infeed and outfeed wheels about the aforementioned axes through the centers of housings 84 and 85.

As previously described, larger or smaller work pieces can be accommodated by shifting the carriages to the right or left, utilizing the power take-off arrangement at the right hand end of the machine for taking power from main shaft 50 to shift both the upper and lower carriages carrying the upper and lower cutters respectively the same amount. Also, of course, circular cuts can be made by utilizing the center punch 144 with the diameter of the circular cut to be made being determined by the location of the center punch and/or the position of the upper and lower carriages.

I claim:

1. A cutting machine for cutting sheet materials, said machine comprising a frame, a pair of circular cutters carried on spaced, parallel and horizontal axles attached to the frame one above the other, said cutters each having a peripheral cutting edge, said cutting edges touching and being overlapped with each other, feed means for feeding work pieces of sheet material between said cutters, said feed means including a pair of power driven feed wheels carried on horizontal axles, one on either side of said cutters whereby one feed wheel operates as an infeed wheel while the other operates as an outfeed wheel, rotatable work piece support devices arranged beneath each of said feed wheels, said feed wheels being operative to move a work piece by a nipping action in which the work piece is squeezed between the wheels and the rotatable support devices, and a feed means steering assembly for changing the orientation of said feed wheels whereby the direction of feed of a work piece can be varied as to effect curved cuts in the work piece.

2. A cutting machine as claimed in claim 1, in which said steering assembly includes a parallel linkage system for keeping said feed wheels in parallelism as the orientation of said feed wheels is changed.

3. A cutting machine as claimed in claim 2, in which each of said cutters is carried on a separate carriage, said carriages being mounted on tracks forming part of said frame, for horizontal movement, and coupling means interconnecting said carriages whereby said carriages are moved together thereby maintaining the preset cooperative relationship between said cutters.

4. A cutting machine as claimed in claim 3, in which said feed wheels are carried by the uppermost carriage and including means for independently raising and lowering said feed wheels relative to said uppermost carriage whereby said feed wheels can be independently lowered down onto a work piece.

5. A cutting machine as claimed in claim 4, in which said infeed wheel is mounted on said uppermost carriage for horizontal movement relative thereto whereby said infeed wheel can be offset relative to said cutters.

6. A cutting machine as claimed in claim 5, in which said rotatable support devices are circular tables positioned beneath said feed wheels on central vertical axles, the tables being canted slightly relative to the horizontal so that as a work piece passes over said tables under the influence of the feed wheels pressing thereagainst, the work piece does not bind against the top surface of the tables.

7. A cutting machine as claimed in claim 5, in which the drive chain for powering said feed wheels includes torque compensators to prevent back lash effects as the orientations and direction of rotation of said feed wheels are changed.

8. A cutting machine as claimed in claim 7, in which said cutters each have two cutting edges, said cutters being reversibly mounted on their axles whereby a second pair of cutting edges can be brought into operation when a first pair becomes dull.

9. A cutting machine as claimed in claim 8, including a center punch carried by the frame of the machine to one side of said cutters whereby a circular cut may be made in a work piece by pressing the center punch against the work piece so that the work piece rotates about the center punch as it is moved through said cutters by said feed means.

* * * * *